G. W. MORSE.
DIRIGIBLE VEHICLE HEADLIGHT.
APPLICATION FILED FEB. 2, 1916.
1,213,399.
Patented Jan. 23, 1917.
2 SHEETS—SHEET 1.
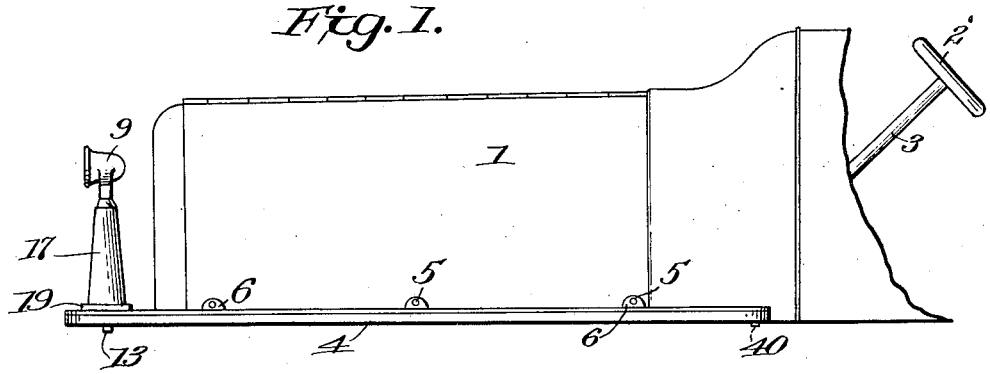
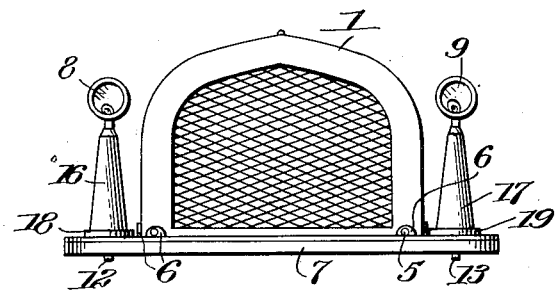
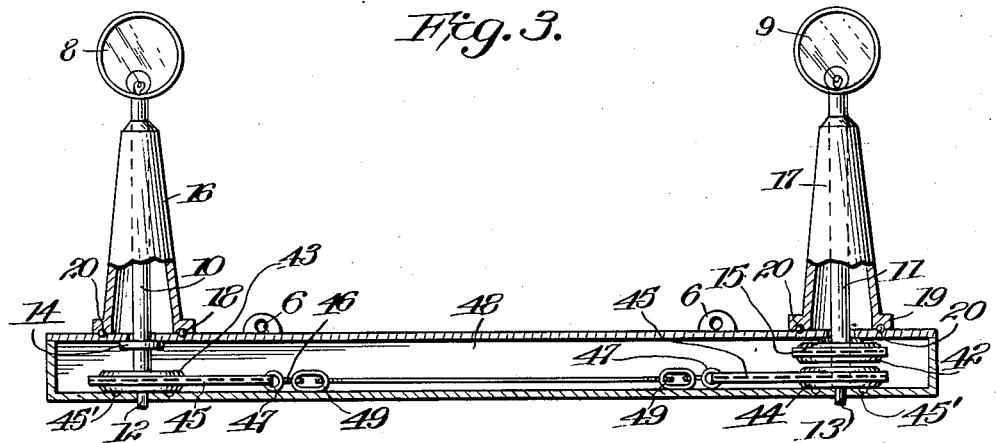
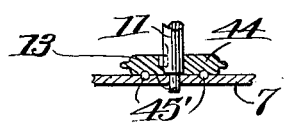
Inventor,
G. W. Morse,
By [signature], Attorney G. W. MORSE.
DIRIGIBLE VEHICLE HEADLIGHT.
APPLICATION FILED FEB. 2, 1916.
1,213,399.
Patented Jan. 23, 1917.
2 SHEETS—SHEET 2.
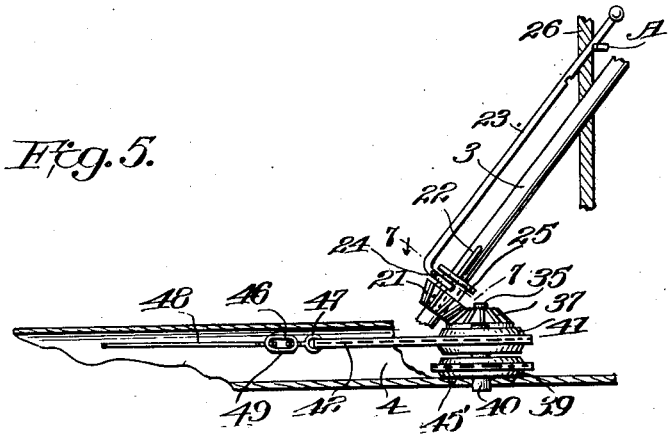
Inventor,
G. W. Morse,
By
Attorney

UNITED STATES PATENT OFFICE.

GEORGE W. MORSE, OF PARK CITY, UTAH.

DIRIGIBLE VEHICLE-HEADLIGHT.

1,213,399.  Specification of Letters Patent. Patented Jan. 23, 1917.

Application filed February 2, 1916. Serial No. 75,651.

*To all whom it may concern:*

Be it known that I, GEORGE W. MORSE, a citizen of the United States, residing at Park City, in the county of Summit and State of Utah, have invented certain new and useful Improvements in Dirigible Vehicle-Headlights, of which the following is a specification.

This invention relates to improvements in dirigible head lights for vehicles.

The general aim of the invention is to provide a novel improved more advantageous and durable headlight means, than has heretofore been proposed.

One important and definite object of the invention is to provide a suitable means whereby the headlight mechanism may be readily operated through turning movement of a steering wheel or rod of an automobile.

A further definite and specific object, is to provide a structure wherein sprocket chains and gearing may be utilized and the chains have suitable tension adjusting means associated therewith.

With the above and additional objects, such as will appear hereinafter, in view, the invention has been embodied in several forms as illustrated in the accompanying drawings, wherein:

Figure 1 is a fragmentary side elevation of an automobile showing the improved headlight mechanism associated therewith; Fig. 2 is a front view of the parts of Fig. 1; Fig. 3 is an enlarged view, mostly in section, through the headlight mechanism at the front of the machine; Fig. 4 is a detail sectional view showing the mounting of the lower sprocket wheels on the casing; Fig. 5 is a fragmentary view, partly in elevation and partly in section, showing the rear elements of the headlight mechanism from the side of the machine; Fig. 6 is a fragmentary plan view showing the gear wheel and associated gearing to impart motion from the steering wheel or rod to the lamps; Fig. 7 is a cross sectional view on the line 7—7 of Fig. 5; Fig. 8 is a perspective view of the latch which may be employed to maintain the gear associated with the steering rod out of driving position; Fig. 9 is a detail fragmentary elevational view of the shifting rod for the gear wheel referred to and Fig. 10 is a front view of an automobile having a modified form of headlight mechanism associated therewith and being partly in section.

Referring specifically to the drawings, wherein like reference characters designate like or similar parts throughout the views, 1 designates an automobile body, 2 the steering wheel and 3 the steering rod turnable through operation of the wheel.

My improved mechanism has most of the operating parts preferably housed by a substantially L-shaped casing of which a side portion 4 is fastened against one side of the body 1 as by means of fastening elements 5 engaging the body and passing through tangs 6 on the casing. The front portion of the casing is designated 7 and like the portion 4 is fastened to the body 1, though at the front thereof, by means of additional fastening elements 5 and tangs 6.

With the form shown in Figs. 1 to 9 inclusive, preferably two lamps are used in the usual manner and which are shown at 8 and 9. Each lamp 8 and 9 is rigidly connected with a rod or shaft as at 10 and 11, which shafts are turnably mounted in the casing at portion 7; extending through the portion and having reduced ends 12 and 13 turnably mounted in the bottom wall of the casing and forming step bearings so that a portion of each shaft may rest on the bottom of the casing. Within the portion 7, shafts 10 and 11 have collars 14 and 15 rigidly secured thereto so as to prevent upward displacement of the shaft. Exteriorly of the casing, the shafts 10 and 11 have bracing bearings or standards 16 and 17 rigidly secured thereto at their tops which extend downwardly and outwardly so as to rest at feet or flanges 18 and 19 on the top of the casing. Flanges 18 and 19 and the top of the casing are provided with suitable grooves which receive balls or friction reducing elements 20 so as to permit proper turning of the lamps while braced without undue noise and friction.

The shafts 10 and 11 are driven by suitable gearing, preferably operable through turning movement of the steering wheel 2 and the steering rod operated thereby. To this end, a beveled gear wheel 21 is slidably mounted on the steering rod 3, but so as to turn with the rod 3 in view of the provision of a spline or key 22 on the rod extending into a groove in the gear wheel. In order to shift the gear wheel, a rod 23 is provided having a yoke 24 to engage the gear wheel 21 at a reduced portion between a collar 25 thereof and the remainder of the gear wheel.

This rod 23 slides through the dashboard which is shown at 26. Suitable means is provided to maintain the rod and gear in an inoperative driving position as shown at A and which is adapted to coöperate with two notches 27 in the rod. This latch A may comprise a fixed part 28 having an angle arm 29 from which projects a guide rod 30. Also lugs 31 are formed integrally if desired, on the fixed part 28 so as to slidably mount the latch proper 32. The latch 32 has a handle 33 through which rod 30 projects. A compression spring 34 surrounds the rod and abuts the arm 29 and handle 33, serving to normally project the latch 32 into the selected notch 27. When the latch disengages the notches, same is moved by mutual engagement with handle 33 against the tension of spring 34.

Mounted on a suitable portion of the body 1, is a vertical stub shaft 21$^b$ and a vertical stub shaft 35 on which respectively is journaled a gear wheel 21$^a$ and a gear wheel having sprocket teeth at 36 and beveled teeth at 27. When gear wheel 21 is in its lowermost position, its teeth mesh gear wheel 21$^a$ whose teeth mesh with the teeth 37 so that the gear wheel 36—37 is turned through turning movement of the rod 3. However, by engagement of the latch means A with the lowermost notch 27 of rod 23, the gear wheel 21 is held out of engagement with gear wheel 36—37 so that the position of the lamps 8 and 9 will not be changed even if rod 3 is turned. Trained around the teeth 36 is a sprocket chain 38 which is also trained around a sprocket wheel 39. A stub shaft 40 has the said sprocket wheel 39 rigid thereon and also a sprocket wheel 41 rigid thereon. Motion from shaft 40 is imparted to the shaft 11 by means of sprocket chain 42 trained around the gear wheel 41 and a gear wheel 42 keyed on the shaft 11. Shafts 10 and 11 have sprocket wheels 43 and 44 keyed thereto over which a sprocket chain 45 is trained and by means of which shaft 10 is turned simultaneously with and from shaft 11 in the same direction and to the same extent. Grooves may be provided in gear wheels 39, 43, and 44 and in the casing to accomodate friction-reducing balls 45'.

From the standpoint of economy in the cost of manufacture, and also in order to provide a means for properly tensioning the chains 42 and 45 when desired, the chain sections have stub screw rods 46 connected thereto as through the medium of eyelets 47 and also have rods 48 with screw threads at each end opposite to those of rods 46 and being connected to the rods 46 by means of turn-buckles 49.

In operation, with the gear wheel 21 in the position shown in Fig. 5, gear wheel 37 will be driven which through the provision of teeth 36 will impart motion to chain 38 which in view of sprocket wheel 39, shaft 40, sprocket wheel 41 and chain 42 will turn shaft 11 and lamp 9. From shaft 11 the chain 45 and associated sprocket wheels turn shaft 10 and the lamp 8. This turning of the lamps, it will be noted, is accomplished simultaneously with the steering of the vehicle and through movement of the steering mechanism. However, when it is desired that the lamps remain stationary, when the steering mechanism is operated, rod 23 is drawn toward the operator and latch means A moved into engagement with the lower notch 27, thus disengaging the gear wheels 21 and 37.

In some instances, it may be necessary or desirable to have but a single lamp disposed centrally of the front of the car as at 50 in Fig. 10. In this figure, the casing is shown in section and designated 51. Let shaft 52 be the equivalent of the shaft 11 and driven in the same manner. Motion will then be imparted to a sprocket wheel 53, thence to a chain 54, a sprocket wheel 55 and a shaft 56 on which sprocket wheel 55 is rigidly fastened and which shaft supports the lamp 50.

Since merely the preferred embodiments have been illustrated and described, it is to be understood that changes in the details of construction may be resorted to within the spirit and scope of the invention as defined by appended claims.

I claim:

1. In combination with a steering device for a vehicle, a lamp, a gear wheel, a gear wheel on the steering device meshing with said gear wheel, a sprocket wheel, means to drive said sprocket wheel from the teeth on the first mentioned gear wheel, a chain trained around said sprocket wheel, and means operable by said chain to shift said lamp.

2. In combination with a lamp, a shaft, a casing in which the shaft is mounted, driving means for the shaft within the casing, means within the casing engaging the casing to prevent displacement of the shaft, brace means connected to the lamp and resting on the casing, and friction reducing means intermediate the brace means and the casing.

3. In combination with a lamp, a shaft therefor, a casing, means within the casing to turn said lamp, said shaft being provided with a bearing to engage the bottom of the casing, and means on the shaft interior of the casing to engage the top of the casing to prevent displacement of the shaft.

4. In combination with a lamp, a shaft therefor, a casing, said shaft extending through said casing and having a bearing engaging its bottom wall, means on said shaft interiorly of the casing to engage the top wall to prevent displacement of the shaft, driving means for the shaft within the casing, and a bearing rigidly connected to the shaft exteriorly of the casing extending outwardly and downwardly and resting on the casing.

5. In combination with a steering member of a vehicle, a gear wheel slidable thereon and turnable therewith, means to secure the gear wheel in an adjusted position, a second gear wheel, a casing, a shaft mounted in said casing, means to drive said shaft from the second mentioned gear wheel, a lamp, a supporting shaft therefor extending through the casing and having a bearing to engage its bottom wall, means to prevent vertical displacement of the last mentioned shaft, means to drive the last mentioned shaft from the first mentioned shaft, bearing means rigid with the supporting shaft and engaging the top of the casing.

In testimony whereof I affix my signature in the presence of two witnesses.

GEORGE W. MORSE.

Witnesses:
  BEN RYAN,
  LE RADDON.